United States Patent [19]

Dietrich

[11] Patent Number: 5,046,834

[45] Date of Patent: Sep. 10, 1991

[54] MICROSCOPE HAVING IMAGE BRIGHTNESS EQUALIZATION

[75] Inventor: Peter Dietrich, Oberkochen, Fed. Rep. of Germany

[73] Assignee: Carl-Zeiss-Stiftung, Heidenheim, Fed. Rep. of Germany

[21] Appl. No.: 534,502

[22] Filed: Jun. 6, 1990

[30] Foreign Application Priority Data

Jun. 10, 1989 [DE]   Fed. Rep. of Germany ....... 3918990

[51] Int. Cl.⁵ .................. G02B 21/02; G02B 7/16; G02B 5/22
[52] U.S. Cl. .................................. 350/520; 359/370; 359/601; 359/888; 359/889
[58] Field of Search ............... 350/520, 509, 510, 415, 350/276 R, 315, 318, 314, 254, 448

[56] References Cited

U.S. PATENT DOCUMENTS

| | | | |
|---|---|---|---|
| 1,693,021 | 11/1928 | Cameron | 350/276 |
| 2,427,689 | 9/1947 | Osterberg et al. | 350/509 |
| 3,503,662 | 3/1970 | Grzelak et al. | 350/510 |
| 4,062,623 | 12/1977 | Suzuki et al. | 350/236 |
| 4,661,692 | 4/1987 | Kawasaki . | |
| 4,756,611 | 7/1988 | Yonekubo et al. | 350/520 |

FOREIGN PATENT DOCUMENTS 3221804 12/1983  Fed. Rep. of Germany .
8530473  4/1987  Fed. Rep. of Germany .

Primary Examiner—Jon W. Henry
Attorney, Agent, or Firm—Walter Ottesen

[57] ABSTRACT

The invention is directed to a microscope equipped with neutral filters adapted to the objectives thereof. These neutral filters are introduced into the imaging beam path of the particular objective in an objective turret of the microscope in order to obtain an image brightness equalization when switching the objectives. The neutral filters are arranged on respective sliders and can be easily removed from the objective turret.

10 Claims, 2 Drawing Sheets

MICROSCOPE HAVING IMAGE BRIGHTNESS EQUALIZATION

FIELD OF THE INVENTION

The invention relates to a microscope which includes a plurality of objectives mounted on an objective turret and an arrangement for equalizing image brightness when switching objectives.

BACKGROUND OF THE INVENTION

The brightness of a microscopic image normally changes when switching objectives on an objective turret. This brightness change is caused by different transmission characteristics of the objectives. The brightness change is especially intense if there is a change between different microscopic methods such as between bright field and dark field illumination.

In view of the above, the observer at the ocular can be subjected to glare during the switchover operation. Account must be taken of significantly different illuminating times for a photographic recording. When the microscopic image is to be recorded with a television camera, the danger is present that the camera will be overdriven and that irreversible damage will occur to the video tube.

To solve this problem, published German patent application DE 32 21 804 discloses an arrangement wherein the light intensity of the microscopic intermediate image is measured with a detector and the lamp voltage of the microscope illumination is correspondingly adjusted. However, this arrangement has the disadvantage that it changes the spectral composition of the light together with the intensity thereof. In this way, the color temperature of the intermediate image changes. This is especially disturbing for microphotographic recordings.

So-called CTV-objectives are also known which are matched to each other with respect to their transmission characteristics with the aid of an absorbing coating on a lens. In this way, a constant image brightness is made possible when switching over the objectives without a change of the color sensation. However, these objectives have been shown to be disadvantageous for the microscopy of objects with very weak light. The light which is already weak is further weakened by the absorbing layer. The possibilities of using these objectives are therefore very limited.

U.S. Pat. No. 4,661,692 discloses a very complex arrangement for equalizing image brightness. This arrangement includes a memory wherein the optical data of the objectives, condensers and filters are stored. The data of the objective which is to be switched into the imaging beam path is read out by a computer from a memory. An optimal condenser is selected in correspondence to these data and brought into the beam path. The computation of the light intensity required for a constant image brightness is computed from the combination of the data of the objective and from the data of the condenser. This light intensity is then adjusted in the best possible manner in that a combination of up to four absorption filters are placed in the beam path of the microscope illumination with these filters being binarily graduated with respect to each other.

Notwithstanding the great technical complexity required for this arrangement, the image brightness equalization takes place with an error which can amount to 50% because of the graduation of the absorption filters.

German utility model registration DE-GM 85 30 473 discloses a microscope having a reflector slider carrying different illuminating reflectors. Another slider which carries neutral density filters is arranged in the beam path parallel to the reflector slider and can be coupled to the reflector slider. In a simple manner, this arrangement makes possible an image brightness equalization which can also be switched off when exchanging illuminating reflectors; that is, when there is a switchover between different contrast methods such as between bright field and dark field. However, an image brightness equalization in the context of an objective switchover on a turret does not take place with this arrangement.

SUMMARY OF THE INVENTION

It is an object of the invention to provide a technically simple and cost-effective arrangement for obtaining an image brightness equalization with a microscope of the kind described above It is another object of the invention to provide such an arrangement wherein the spectral composition of the light is not changed when switching over objectives and which is easily switched off.

According to a feature of the invention, sliders which carry absorbing optical elements are provided to coact with the objectives. The sliders can be inserted into the particular objective or they can be inserted into the beam path of the objective behind the latter. These insertions are performed with the aid of corresponding slider apertures.

The absorbing optical elements can be adapted very precisely to the corresponding objective and thereby provide a very precise equalization of the light intensity.

The sliders inserted into the corresponding objective or into its beam path in the objective turret are automatically switched when there is a switchover of the objectives. For this purpose, neither an electronic control unit nor a motoric drive or a complex ancillary mechanism is required. The image brightness equalization is assured especially even directly after a switchover between objectives having different light intensities whereby light-sensitive apparatus mounted on the microscope are protected and the observer is not subjected to glare.

Since the image brightness equalization takes place without a change of the electrical voltage at the illuminating device, the spectral composition of the light is not changed so that the color temperature is only insignificantly influenced by an exchange of objectives during microphotographic recordings.

The absorbing optical elements can be simply removed from the imaging beam path if very light-attenuating objects are viewed with the microscope or if it is intended to operate in dark field. For this purpose, the slider is pulled out of the particular objective or out of the objective turret. The full light transmitting capacity of the objectives is then available to the user.

The sliders which carry the absorbing optical elements are advantageously so configured that they can be exchanged for other sliders. These other sliders can, for example, carry differential interference contrast prisms. In this way, those microscopes which are already available and suitable for this contrast method can be retrofitted with the image brightness equalization according to the invention with little effort.

On the other hand, the image brightness equalization is also possible with an exchange of microscope methods (such as for the transition from bright field to differential interference contrast microscopy) when the sliders carrying the corresponding differential interference contrast prisms are disposed in the beam paths of the differential interference contrast objectives while at the same time sliders having suitable absorbing optical elements are inserted into the beam paths of the bright field objectives.

An image brightness equalization can be provided in transmitted-light microscopy as well as for reflected-light microscopy. The absorbing optical elements are mounted so that they are inclined to the imaging beam path in order to reflect disturbing residual light reflections out of the reflected light illumination at the surfaces of the absorbing optical elements from the imaging beam path.

The solution according to the invention for the image brightness equalization is especially well suited for microscopes wherein the beam path extends telecentrically behind the objective. The absorbing optical element can be brought into this telecentric beam path by insertion into the objective turret. The absorbing optical elements have no influence on the imaging quality of the microscopic intermediate image when these elements are brought into the telecentric beam path. A refocusing because of a changed optical tube length is not necessary.

Neutral density filters can be used as absorbing optical elements. The absorption of such filters is approximately constant over the entire visible spectral range so that they have no influence on the color sensation of microphotographic recordings. Furthermore, the absorption of these filters can be precisely adjusted by means of the glass thickness.

BRIEF DESCRIPTION OF THE DRAWINGS

The invention will now be described with reference to the drawings wherein:

FIG. 3b is a section view through the slider taken along line IIIb—IIIb of FIG. 3a.

DESCRIPTION OF THE PREFERRED EMBODIMENTS OF THE INVENTION

Figure 1:
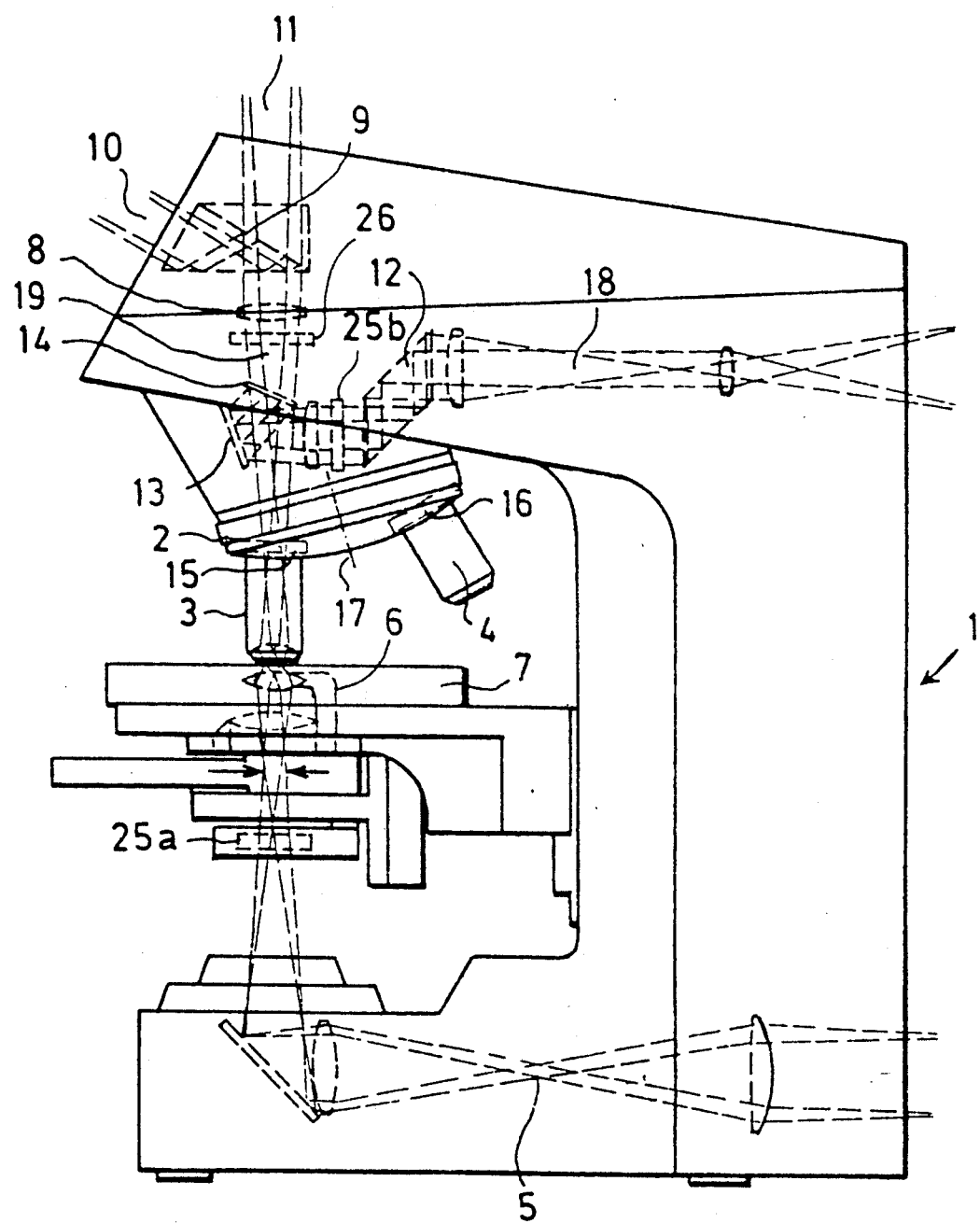
FIG. 1 is a side elevation view of a microscope according to the invention having slider openings in the objective turret.

Reference numeral 1 identifies a microscope stand. The microscope supports an objective turret 2 having a plurality of objectives (3, 4) of which only two are shown. Transmitted-light illumination is provided and defines a beam path identified by reference numeral 5. The transmitted-light condenser 6 is disposed below the object stage 7. The objective 3 is corrected to a focal intercept of infinity so that the beam path between the objective 3 and the tubular lens 8 runs telecentrically. The deflecting prism 9 having a beam splitter splits the viewing beam 19 into the ocular 10 and the photo outlet 11.

The light of a reflected-light illumination has a beam path identified by reference numeral 18. This light is reflected into the objective 9 via stepped mirrors 12 and the mirrors (13, 14).

Neutral density filters (15, 16) are provided in the objective turret 2 for respective objectives (3, 4). The neutral density filters (15, 16) can be inserted into the imaging beam path of the corresponding objective. The transmission of the neutral density filters (15, 16) is so determined that the transmission of the combination of objective 3 and filter 15 equals the transmission of the combination of objective 4 and filter 16. The transmission of the neutral density filter (15, 16) can be very precisely adjusted by means of the glass thickness. For this reason, it is possible without difficulty to match the transmission of the combinations of objectives and corresponding neutral density filters to each other with great precision.

For switching the objectives, the objective turret is rotated about its axis 17 until the objective 4 is disposed in the viewing beam path in lieu of the objective 3. With this rotation, the neutral density filter 16 is automatically rotated therewith and is likewise brought into the imaging beam path so that the image brightness equalization takes place synchronously with the objective switchover.

The neutral density filter (15, 16) are arranged in the objective turret and therefore in the telecentric region of the imaging beam path. A change of the optical tube length when removing a neutral density filter or when switching over to an objective having a neutral density filter of another thickness corresponding thereto has no influence on the imaging quality. Accordingly, a refocusing is not necessary.

Figure 3A:
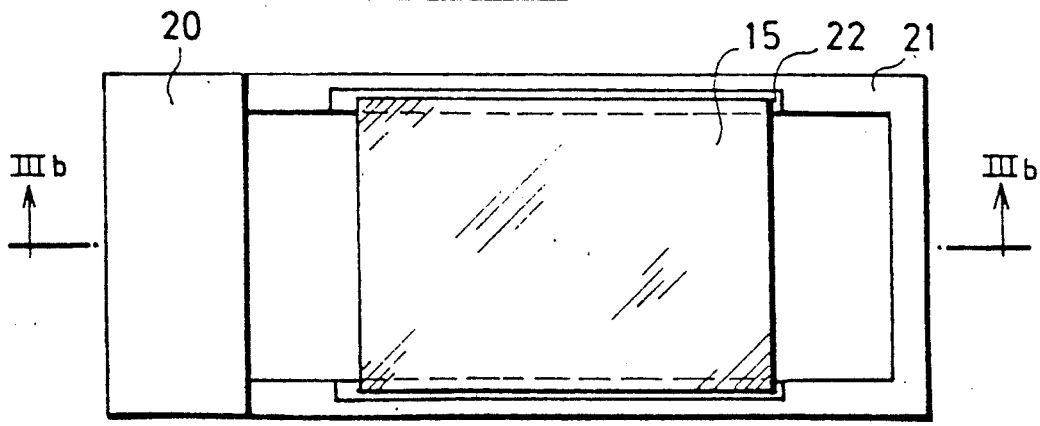
FIG. 3a is a plan view of a slider carrying a neutral densify filter.
Figure 3B:
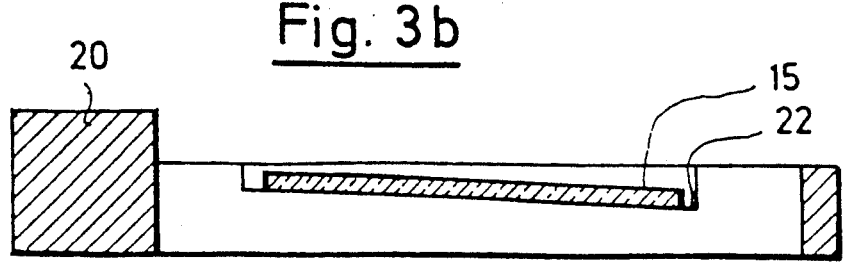

Each microscope objective is provided with a slider 20 shown in FIGS. 3a and 3b. The slider 20 accommodates the neutral density filter 15. The neutral density filter 15 lies on two recesses 22 which are formed in two lateral slider struts 21. These recesses 22 have a varying depth along the length of the struts 21 so that the neutral density filter is inclined in the slider. The inclination provides that the residual reflections of the incident light are reflected from the neutral density filters (15, 16) out of the imaging beam path 19.

The arrangement of the neutral density filters with respect to the incident light objectives takes into account that the objective is its own condenser and therefore only the region of the object is illuminated which lies in the field of view. For this reason, the incident light objectives are provided with other neutral density filters than transmitted-light objectives which have the same transmission. The sliders 20 can be simple injection-molded parts made of plastic.

Figure 2:
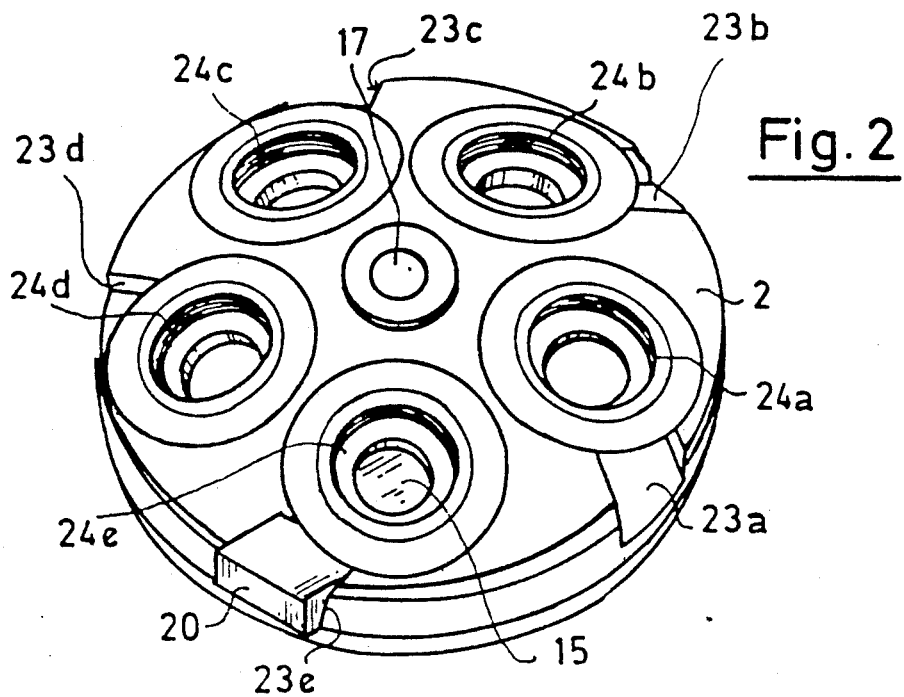
FIG. 2 is a perspective view of the objective turret of the microscope shown in FIG. 1.

The objective turret 2 shown in FIG. 2 is provided with five objective mounts (24a to 24e) in which the objectives (not shown in FIG. 2) are threadably engaged. Each objective mount (24a to 24e) is provided with a slider opening (23a to 23e) by means of which a neutral density filter 15 carried in a slider 20 can be introduced into the imaging beam path of the particular objective seated in its mount.

The sliders 20 can be easily removed from the objective turret for making microscopic investigations especially of light-attenuating objects. The original light transmitting capacity objectives is then again available to the observer. The measure for providing image brightness equalization therefore does not limit the utility of the objectives.

The transmissions of all objectives seated in such an objective turret 2 can be easily matched to each other by means of the sliders 20 corresponding to the objectives even when these objectives are provided for different microscopic methods such as bright field and phase contrast microscopy. The sliders 20 carry neutral density filters and can be easily exchanged for corresponding sliders equipped with differential interference contrast prisms so that image brightness equalization is possible even when switching over from bright field to differential interference contrast microscopy. The polarizers (25a and 25b) and the analyzer 26 are provided for this contrast process in FIG. 1.

It is understood that the foregoing description is that of the preferred embodiments of the invention and that various changes and modifications may be made thereto without departing from the spirit and scope of the invention as defined in the appended claims.

What is claimed is:

1. A microscope comprising:
   a mounting structure having an optical axis defining a beam path;
   an objective turret having a plurality of objectives seated therein and said objectives having different light intensities;
   said objective turret being rotatably mounted on said mounting structure for rotatably indexing said objectives into said beam path; and,
   an arrangement for equalizing image brightness when indexing said objectives into said beam path, the arrangement including:
   a first slider corresponding to a first one of said objectives and a second slider corresponding to a second one of said objectives;
   first and second light-absorbing optical elements mounted in said first and second sliders, respectively;
   said first light-absorbing optical element and said first object conjointly defining a first optical unit and said second light-absorbing optical element and said second objective conjointly defining a second optical unity;
   said first and second light-absorbing optical elements having first and second coefficients of transmission selected so as to cause said optical units to provide equal image brightness;
   each of said objectives defining an objective lens axis which is coincident with said beam path when the objective is indexed thereinto; and,
   said turret including mounting means for insertingly receiving each of said sliders so as to permit the slider to be moved between a first position wherein the element does not intersect the lens axis and a second position wherein the element is transverse to said axis and in said beam path when the objective is indexed thereinto.

2. The microscope of claim 1, said mounting means being a plurality of slider openings formed in said turret so as to permit said optical elements to be inserted into the objective corresponding thereto.

3. The microscope of claim 1, said mounting means being a plurality of slider openings formed in said turret so as to permit said optical elements to be inserted behind the objective corresponding thereto.

4. The microscope of claim 1, said sliders being a first set of sliders and the microscope further comprising a second set of sliders and a plurality of differential interference contrast prisms mounted in corresponding ones of the sliders of said second set of sliders; and, said mounting means being adapted to permit said first set of sliders to be removable from said turret and to permit said second set of sliders to be insertable therein.

5. The microscope of claim 1, said mounting means being formed in said turret so as to cause said optical elements to be inclined with respect to said beam path when each of said sliders is in said second position and the objective corresponding thereto is indexed into said beam path.

6. The microscope of claim 1, at least one of said objectives being corrected so as to cause said beam path to run telecentrically behind said objective; and, said mounting means being a plurality of slider openings formed in said turret so as to permit said optical elements to be inserted into said beam path behind said objective.

7. The microscope of claim 1, said optical elements being respective neutral density filters.

8. A microscope comprising:
   a mounting structure having an optical axis defining a beam path;
   an objective turret having a plurality of objectives seated therein end said objectives having different light intensities;
   said object turret being rotatably mounted on said mounting structure for rotatably indexing said objectives into said beam path; and,
   an arrangement for equalizing image brightness when indexing said objectives into said beam path, the arrangement including:
   a plurality of sliders corresponding to respective ones of said objectives;
   a first slider corresponding to a first one of said objectives and a second slider corresponding to a second one of said objectives;
   first and second light-absorbing optical elements mounted in said first and second sliders, respectively;
   said first light-absorbing optical element and said first objective conjointly defining a first optical unit and said second light-absorbing optical element and said second objective conjointly defining a second optical unit;
   said first and second light-absorbing optical elements having first and second coefficients of transmission selected so as to cause said optical units to provide equal image brightness;
   a plurality of differential interference contrast prism elements mounted in the remaining ones of said sliders;
   each of said objectives defining an objective lens axis which is coincident with said beam path when the objective is indexed thereinto; and,
   said turret including mounted means for insertingly receiving each of said sliders so as to permit the slider to be moved between a first position wherein the element does not intersect the lens axis and a second position wherein the element is transverse to said axis and in said beam path when the objective is indexed thereinto.

9. The microscope of claim 1, each of said sliders having only a single light-absorbing optical element mounted therein.

10. The microscope of claim 1, each of said light-absorbing optical elements being configured as an optical flat.

* * * * *

UNITED STATES PATENT AND TRADEMARK OFFICE
CERTIFICATE OF CORRECTION

PATENT NO. : 5,046,834
DATED : September 10, 1991
INVENTOR(S) : Peter Dietrich

It is certified that error appears in the above-identified patent and that said Letters Patent is hereby corrected as shown below:

In column 2, line 23, after "above", insert -- . --.

In column 2, line 40, after "path", delete -- - --.

In column 3, line 49: delete "densify" and substitute -- density -- therefor.

In column 5, line 37: delete "object" and substitute -- objective -- therefor.

In column 5, line 40: delete "unity" and substitute -- unit -- therefor.

In column 6, line 23: delete "end" and substitute -- and -- therefor.

UNITED STATES PATENT AND TRADEMARK OFFICE
CERTIFICATE OF CORRECTION

PATENT NO.  : 5,046,834

DATED       : September 10, 1991

INVENTOR(S) : Peter Dietrich

It is certified that error appears in the above-identified patent and that said Letters Patent is hereby corrected as shown below:

In column 6, line 25: delete "object" and substitute -- objective -- therefor.

In column 6, line 54: delete "mounted" and substitute -- mounting -- therefor.

Signed and Sealed this

Thirtieth Day of March, 1993

*Attest:*

STEPHEN G. KUNIN

*Attesting Officer*   Acting Commissioner of Patents and Trademarks